(12) United States Patent
Langford

(10) Patent No.: US 6,198,588 B1
(45) Date of Patent: Mar. 6, 2001

(54) DATA STORAGE

(76) Inventor: Stephen Langford, Lanesend Cottage, Whale Wharf Road, Littleton-upon-Severn, Bristol BS12 1MW (GB)

( * ) Notice: Subject to any disclaimer, the term of this patent is extended or adjusted under 35 U.S.C. 154(b) by 0 days.

(21) Appl. No.: 08/936,843

(22) Filed: Sep. 23, 1997

(30) Foreign Application Priority Data

Sep. 24, 1996 (EP) .................................................. 96306933

(51) Int. Cl.[7] ............................. G11B 5/035; G11B 5/09; G11B 15/46; G11B 15/52
(52) U.S. Cl. ................................ 360/65; 360/46; 360/48; 360/73.04; 360/73.12; 375/232
(58) Field of Search ........................... 360/48, 65, 73.04, 360/77.12, 46, 53; 375/232

(56) References Cited

U.S. PATENT DOCUMENTS

| 5,150,379 | 9/1992 | Baugh et al. . |
| 5,623,474 | * 4/1997 | Oshio et al. ............................ 360/65 |

FOREIGN PATENT DOCUMENTS

| 0527579A1 | 7/1992 | (EP) . |
| 0577901A1 | 7/1992 | (EP) . |
| 96306933 | 7/1996 | (EP) . |

* cited by examiner

Primary Examiner—W. Chris Kim
Assistant Examiner—Regina Y. Neal

(57) ABSTRACT

The present invention relates to apparatus for reading and writing data to a storage medium, wherein the data is written to the medium in tracks, each track having a predetermined trigger signal pattern, the apparatus comprising:

structure for detecting the predetermined trigger signal pattern;

an adaptive filter for signals read from the medium;

and structure for triggering adaptive filtering for a track of data on detection of the predetermined trigger signal pattern in that track. In this way, during a read operation adaptive filtering is triggered on commencement of data with spectral characteristics suitable for adaption of the filter. In the embodiment to be described, each track comprises data fragments each having a header containing ancillary information wherein at least a header in an initial data fragment in the track comprises the predetermined trigger signal pattern. Preferably, at least the header of the initial data fragment in the track comprises the predetermined trigger signal pattern.

13 Claims, 5 Drawing Sheets

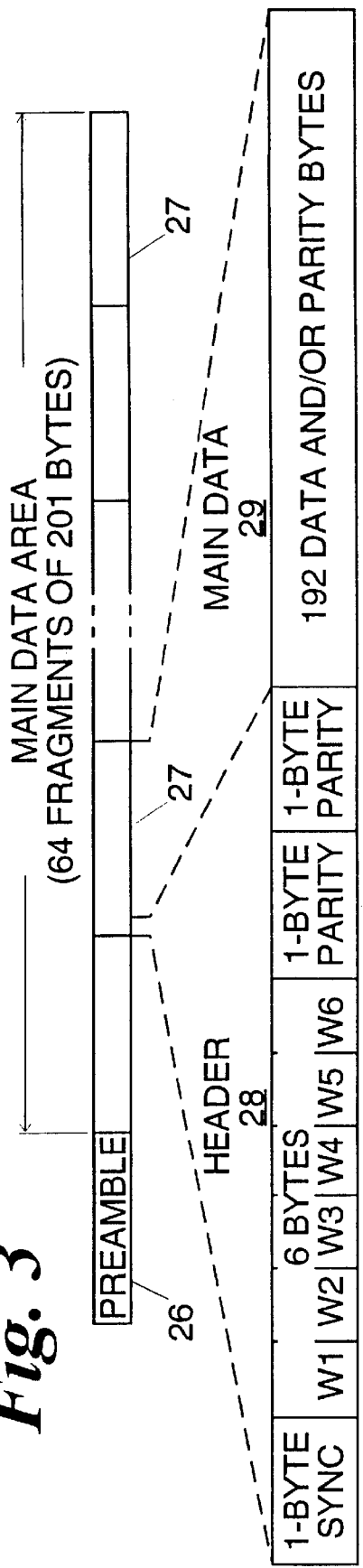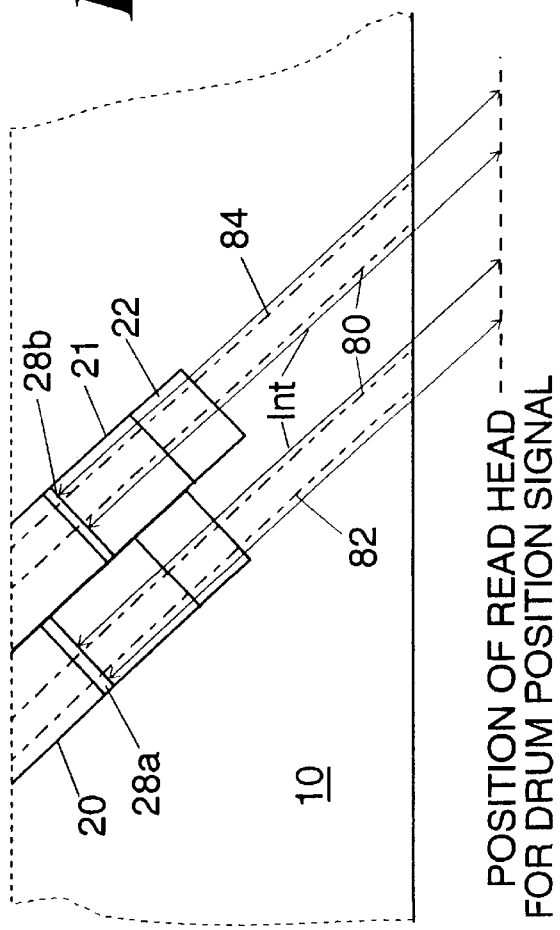

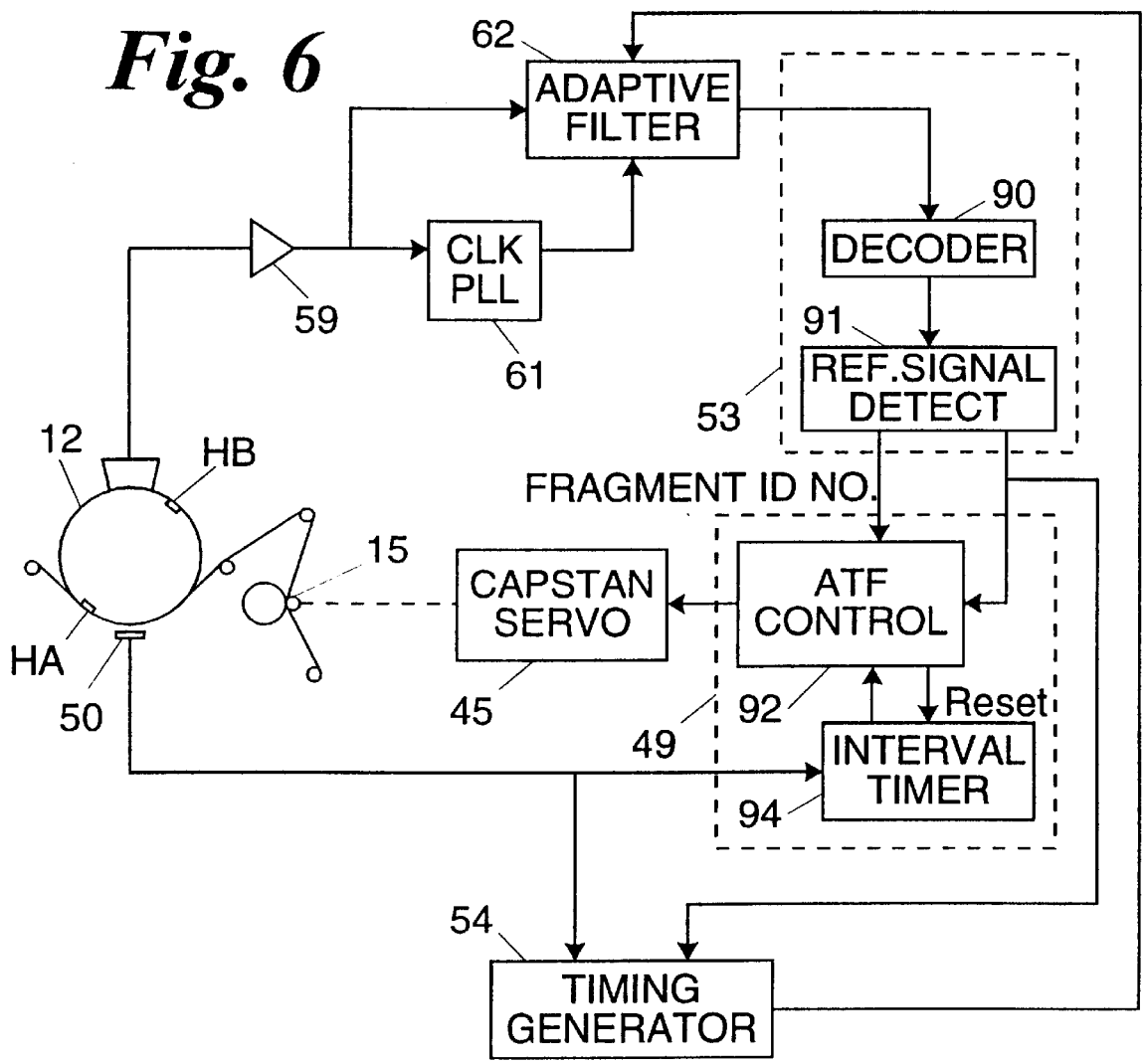

DATA STORAGE

TECHNICAL FIELD

This invention relates to methods and apparatus for data storage, and particularly, though not exclusively, to methods and apparatus for controlling reading of data from elongate magnetic tape media in a helical scan tape drive.

BACKGROUND ART

It is already known to provide reliable storage and retrieval of large volumes of digital data, such as computer data, in particular by means of the DDS (Digital Data Storage) format defined in ISO/IEC Standard 10777:1991 E and implemented in helical scan tape drives made by several companies.

In the DDS system an elongate recording medium comprising tape coated with a magnetic medium is moved by a motor-driven capstan along a path wrapped partially around a transducer comprising a rotating drum carrying one or more electromagnetic heads. The plane of rotation of the drum is disposed at an angle to the plane of movement of the tape, so that each head traverses the tape along successive tracks extending across the width of the tape at an angle to its centreline.

In helical scan data storage devices, it is sometimes necessary or advantageous to employ adaptive filtering in the processing of the signal(s) read from the read head(s). An adaptive filter automatically adjusts its response according to certain properties of the incoming signal. Adaptive filters are well-known and an example of an adaptive filter used in a backup storage device can be seen in Applicants' U.S. Pat. No. 5150379. A typical characteristic of such a filter is a tendency to adopt an undesirable response when presented with a signal which has a spectral content which differs from the normal data signal. In helical scan recording, it is common for such signals to be recorded in margin or preamble parts of the track format.

Typically the precise location of each track is determined during recording of data on the tape by the position relative to the tape of write heads on the drum. To ensure optimum retrieval of data from the tape, it is desirable for read heads on the drum to follow paths across the tape which are at essentially identical positions to those followed by the write heads during data recording. This in turn requires control during data retrieval of relative motion between the tape and the drum, by controlling rotation of the drum and/or controlling movement of the tape by the capstan.

A system for providing such control is described in Applicants' co-pending published European Application No. 671735 and is incorporated herein by reference. In that system, the rotary head drum generates a position signal at one or more predetermined angular positions which is used to control the motion of the media.

This drum position signal is also used as a reference for the generation of a timing signal to enable and inhibit adaption of the filter characteristics according to the position of the read head in the track.

However, it is typical for the height of the recorded tracks relative to the reference edge of the medium to vary according to environmental factors, and across a population of data storage devices. It is therefore necessary to incorporate considerable timing margin in the signal which enables and inhibits filter adaption, so as to guarantee that adaption does not take place at a time when the signal from the read head has undesirable spectral characteristics. As a result, adaption of the filter characteristics is normally enabled relatively late, to the detriment of error performance achieved on the early part of the data.

The present invention aims to overcome this limitation.

DISCLOSURE OF THE INVENTION

According to the present invention there is provided apparatus for reading and writing data to a storage medium, wherein the data is written to the medium in tracks, each track having a predetermined trigger signal pattern, the apparatus comprising:

means for detecting the predetermined trigger signal pattern;

an adaptive filter for signals read from the medium;

and means for triggering adaptive filtering for a track of data on detection of the predetermined trigger signal pattern in that track.

In this way, during a read operation adaptive filtering is triggered on commencement of data with spectral characteristics suitable for adaption of the filter.

In the embodiment to be described, each track comprises data fragments each having a header containing, ancillary information wherein at least a header in an initial data fragment in the track comprises the predetermined trigger signal pattern. Preferably, at least the header of the first data fragment in the track comprises the predetermined trigger signal pattern.

In the embodiment to be described, the predetermined trigger signal pattern is also used to control the motion of the medium.

According to another aspect of the present invention we provide a method of triggering adaptive filtering in apparatus for reading and writing data to a storage medium in the form of tracks comprising:

monitoring for the presence of a predetermined trigger signal pattern during reading of data from a track and triggering adaptive filtering of the data in the track when the the predetermined trigger signal pattern is detected.

BRIEF DESCRIPTION DRAWINGS

An embodiment of the present invention will now be described, by way of example, with reference to the accompanying drawings, in which:

FIG. 3 is a diagrammatic representation of the format of a main data area of a data track;

FIG. 5 is an illustration of the principle of the track following technique used in the invention;

FIG. 6 is a block schematic diagram of track following circuits forming part of the apparatus of FIG. 4;

BEST MODE FOR CARRYING OUT THE INVENTION & INDUSTRIAL APPLICABILITY

The data storage apparatus now to be described utilizes a helical scan technique for storing data in oblique tracks on a recording tape in a format similar to that used for the storage of PCM audio data according to the DAT Conference Standard (June 1987, Electronic Industries Association of Japan, Tokyo, Japan). The present apparatus is, however, adapted for storing computer data rather than digitized audio information.

Figure 1:
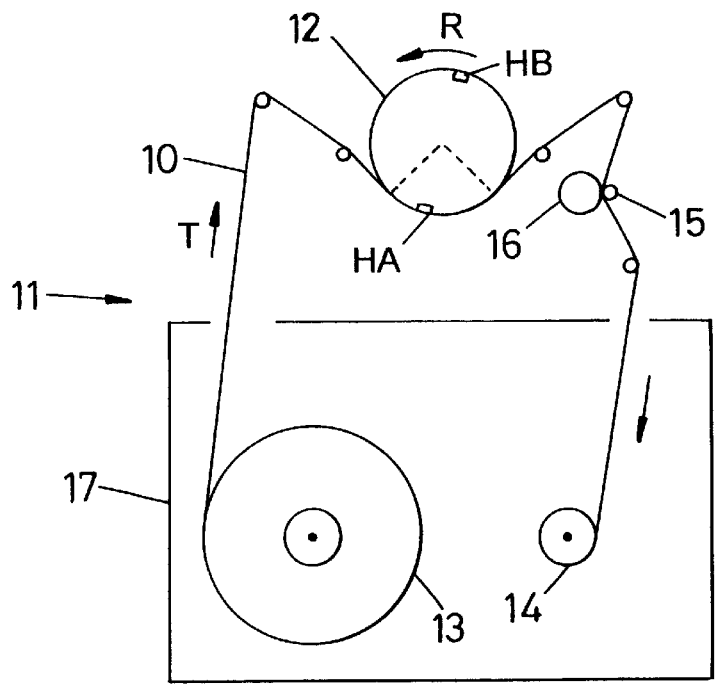
FIG. 1 is a diagram of the main physical components of a tape deck employing helical scan recording.
Figure 2:
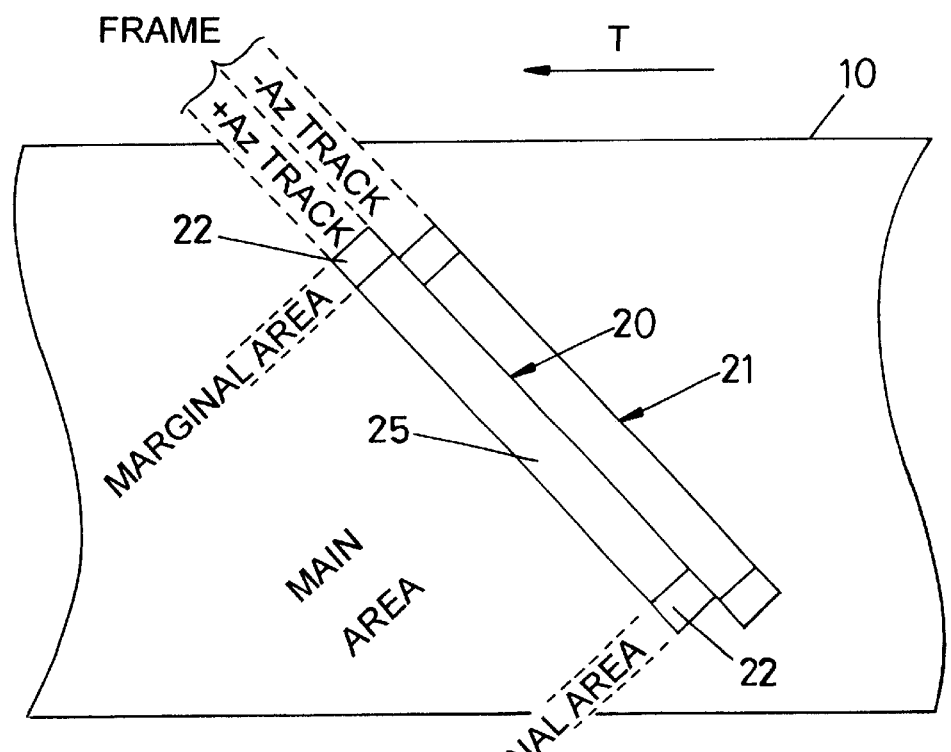
FIG. 2 is a diagrammatic representation of two data tracks recorded on tape using helical scan recording.

FIG. 1 is an illustration of the basic layout of a helical-scan tape deck 11 in which tape 10 from a tape cartridge 17 passes at a predetermined angle across a rotary head drum 12 with a wrap angle of approximately 90°. In operation, the tape 10 is moved in the direction indicated by arrow T from a supply reel 13 to a take-up reel 14 by rotation of a capstan 15 against which the tape is pressed by a pinch roller 16; at the same time, the head drum is rotated in the sense indicated by arrow R. The head drum 12 houses two read/write heads HA, HB angularly spaced by 180°. In known manner, these heads HA, HB are arranged to write overlapping oblique tracks 20, 21 respectively across the tape 10 as shown in FIG. 2. The track written by head HA has a positive azimuth while that written by head HB has a negative azimuth. Each pair of positive and negative azimuth tracks, 20, 21 constitutes a frame.

The basic format of each track as arranged to be written by the present apparatus is illustrated in FIG. 2. Each track comprises two marginal areas 22 and a main area 25. The main area 25 is used to store data provided to the apparatus (main data), together with certain auxiliary information. The items of auxiliary information are known as sub codes and relate, for example, to the logical organization of the main data, its mapping onto the tape, certain recording parameters (such as format identity, tape parameters etc.), and tape usage history. The main area 25 also includes synchronization bytes ('sync bytes') which enable the boundaries between successive data bytes stored on the tape to be identified, and which are also used to generate timing signals for controlling tape movement so that the heads HA, HB follow the tracks accurately, by measuring the time interval between signals indicative of the drum position and reference signals including the sync bytes.

The data format of the main area 25 of a track is illustrated in FIG. 3. The main area is composed of a pre-amble block 26, followed by sixty-four sections or 'fragments'27 each two hundred and one bytes long. The block 26 is a pre-amble which contains timing data patterns to facilitate timing synchronization on playback. The fragments 27 make up the 'Main Data Area'. Each fragment 27 in the Main Data Area comprises a nine-byte 'Header' region 28 and a one hundred and ninety-two byte 'Main Data' region 29, the compositions of which are shown in the lower part of FIG. 3.

The Header region 28 is composed of a sync byte as mentioned above, six information-containing bytes W1 to W6, and two parity bytes. The first information byte W1 contains a six-bit Fragment ID which identifies the fragment within the main area 25. Byte W2 contains an Area ID sub code in its four most significant bits, and a frame number in its four least significant bits which is incremented mod 16 between consecutive frames. Bytes W3 to W6 contain sub codes providing information about the contents of the track and the history of usage of the tape. The parity bytes comprise a sixteen-bit cyclic redundancy check (CRC) code derived from the contents of the remainder of the Header region.

The Main Data region 29 of each fragment 27 is composed of one hundred and ninety-two bytes (comprising six successive thirty-two byte blocks) generally constituted by main data and/or main-data parity. However, it is also possible to store sub codes in the Main Data region if desired.

In summary, main data are stored in the Main Data regions 29 of the Main Data Area fragments 27 of each track, while sub codes can be stored both in the Header and Main Data regions 28, 29 of Main Data Area fragments 27.

Figure 4:
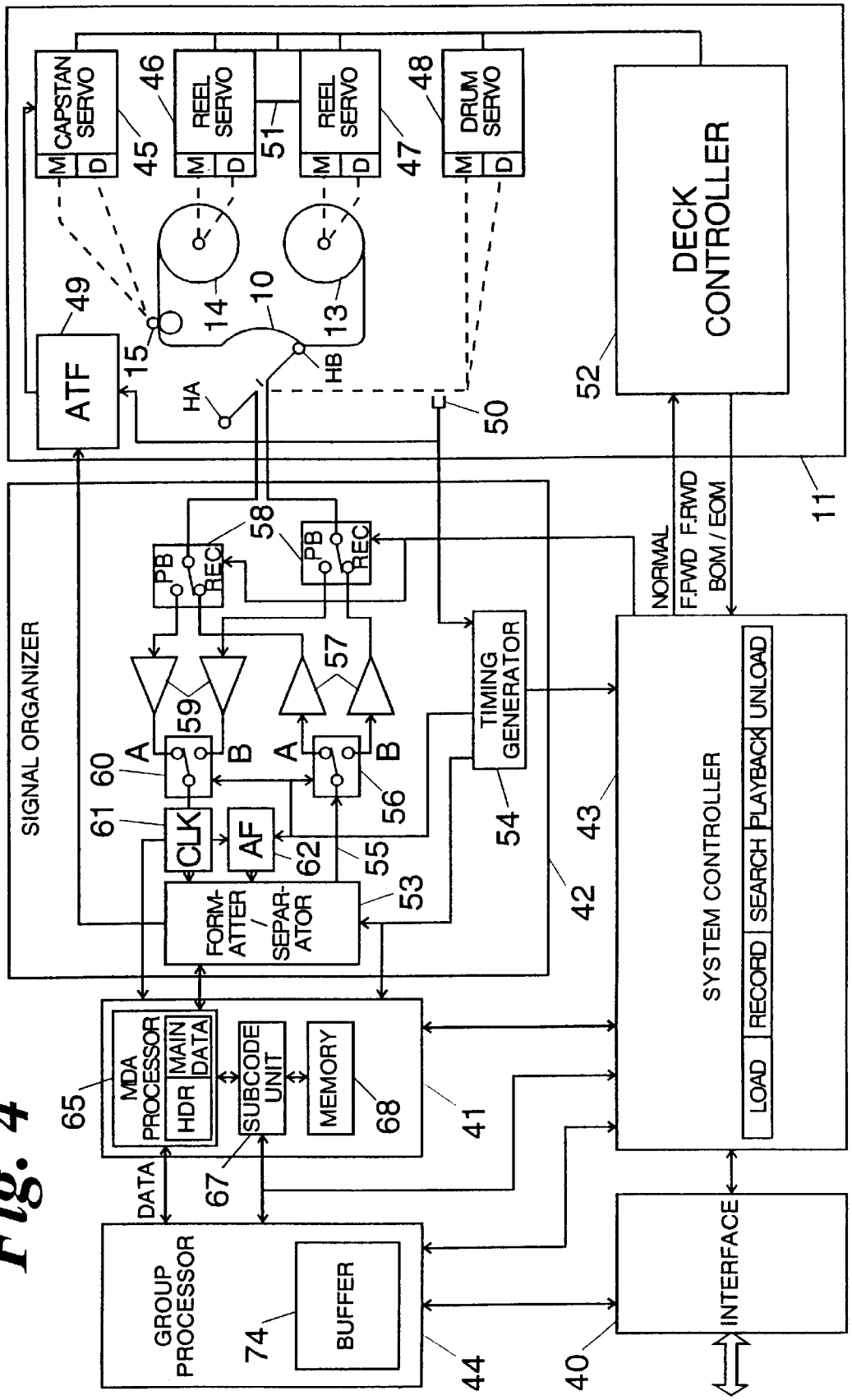
FIG. 4 is a block diagram of the main components of the data storage apparatus.

FIG. 4 is a block diagram of the data storage apparatus in its entirety including the tape deck 1 1 already described in part with reference to FIG. 1. In addition to the tape deck, the apparatus includes an interface unit 40 for interfacing the apparatus with a computer (not shown); a group processor 44 and a frame data processor 41 for processing main data and sub codes into and out of a Main Data Area fragment 27; a signal organiser 42 for composing/decomposing the signals for writing/reading a track and for appropriately switching the two heads HA, HB; and a system controller 43 for controlling the operation of the apparatus in response to commands received from a computer via the interface unit 40. The signal organiser 42 comprises an adaptive filter 62 for filtering data being read in a way which improves the read error rate. Each of the main component units of the apparatus will be further described below.

The data storage apparatus is arranged to respond to commands from a computer to load/unload a tape, to store a data record and other logical segmentation marks, to search for a selected record using the segmentation marks, and to read back the next record.

The interface unit 40 is arranged to receive the commands from the computer and to manage the transfer of data records and logical data segmentation marks between the apparatus and computer. Upon receiving a command from the computer, the unit 40 passes it on to the system controller 43 which, in due course will send a response back to the computer via the unit 40 indicating compliance or otherwise with the original command. Once the apparatus has been set up by the system controller 43 in response to a command from the computer to store or read data, then the interface unit 40 will also control the passage of records and segmentation marks between the computer and the group processor 44.

During data storage the group processor 44 is arranged to segment the main data provided to it in the form of data records into data packages each containing an amount of data corresponding to a fixed number (group) of frames (for example, twenty two). This segmentation is effected without regard to the logical organization of the data (that is, how it is divided into records). Information regarding the logical segmentation of the data (record divisions, file marks) is stored in an index which is generated by the processor 44 and which forms the last portion of data making up a group. The processor 44 also generates certain sub codes whose contents are group-dependent or concern the logical segmentation of data. To facilitate these tasks and the transfer of data to and from the processor 44, the latter is provided with a large buffer 74 which is arranged to hold several (for example, three) group's worth of data.

Once a group, including its index, has been assembled, it is transferred a frame at a time to the frame data processor 41. Conceptually there is no need for the frame data processor 41 to be aware of the grouping of frames as the group processor 44 could simply pass it a frame's worth of main data at a time together with the appropriate sub codes. However, in order to speed the transfer of data between the processors 44 and 41, it is advantageous for the frame data processor 41 to be managed in terms of groups for receiving data from the processor 44— in other words, during recording of data, the processor 41 is told by the group processor 44 when a group is ready for processing after which the processor 41 accesses the frames of the group autonomously from the buffer 74.

When data are being read from tape, the group processor 44 is arranged to receive main data from the processor 41 on a frame-by-frame basis, the data being written into the buffer 74 in such a manner as to build up a group. The group processor 44 can then access the group index to recover information on the logical organization (record structure, file marks) of the main data in the group. Using this information the group processor can pass the requested record or segmentation mark to the computer via the interface unit 40.

To facilitate the assembly of frame data back into a group's worth of data, each frame can be tagged with an in-group sequence number when the frame is written to tape. This in-group number can be provided as a sub code that, for example, is included at the head of the Main Data region of the first fragment in the Main Data Area of each track of a frame. The sub code is used on playback to determine where the related frame data are placed in the buffer 74 when passed to the group processor 44.

The frame data processor 41 functionally comprises a Main-Data-Area (MDA) processor 65 and a sub code unit 67 with an associated electronic memory 68 for tape usage data (in practice, these functional elements may be constituted by a single microprocessor running appropriate processes under program control).

The sub code unit 67 is arranged to provide sub codes to the processor 65 as required during recording and to receive and distribute sub codes from the processor 65 during playback. Dependent on their information contents, sub codes may be generated/required by the group processor 44 or the system controller; the Area ID sub code is, for example, determined by/used by the controller 43. In the case of non-varying sub codes such as certain recording parameters, the sub codes may be permanently stored in the unit 67. Furthermore, frame-dependent sub codes such as absolute frame number, may conveniently be generated by the sub code unit 67 itself.

With regard to the tape usage sub codes, these are read off from the system area of a tape upon first loading and stored by the unit 67 in the memory 68. During a tape usage session, the tape usage data held in the memory 68 are updated by the unit 67 as appropriate on the basis of inputs received from the processors 44, 65 and the controller 43; thus if a record is kept of the number of main data frames read/written (either directly or in terms of the number of groups read and written), then these data must be continually updated by the unit 67 as a result of inputs from the processor 65 (or possibly the processor 44 if groups are counted). At the end of a tape usage session, the contents of the memory 68 are stored to tape within a log area of the tape system area, the latter being rewritten at the end of each session of usage. The multiple storage of the tape usage sub codes within the log area together with associated parity information, ensures a very high probability that the tape usage sub codes can be read back from the tape even in the presence of tape defects or other similar degradations.

The MDA processor 65 is arranged to process a frame's worth of main data at a time together with the associated sub codes in the fragment Header regions. Thus during recording, the processor 65 receives a frame's worth of main data from the group processor 44 together with sub codes from the unit 67. On receiving the main data the processor 65 interleaves the data, and calculates error correcting codes and parity values, before assembling the resultant data and sub codes to output the Main-Data-Area fragments for the two tracks making up a frame. Before assembling the main data with the sub codes, scrambling (randomizing) of the data may be effected to ensure a consistent RF envelope independent of the data contents of a track signal.

During playback, the processor 65 effects a reverse process on the two sets of Main-Data-Area fragments associated with the same frame. Unscrambled, error-corrected and de-interleaved main data are passed to the group processor 44 and sub codes are separated off and distributed by the unit 67 to the processor 44 or system controller 43 as required.

The signal organizer 42 comprises a formatter/separator unit 53 which during recording (data writing) is arranged to assemble Main-Data-Area fragments provided by the frame data processor 41, to form the signal, including the sync bytes, to be recorded on each successive track. The necessary pre-amble patterns are also inserted into the track signals where necessary by the unit 53. Timing signals for coordinating the operation of the unit 53 with rotation of the heads HA, HB are provided by a timing generator 54 fed with drum position signals output by a pulse generator 50 responsive to head drum rotation and located in the tape deck 11. The track signals output on line 55 from the unit 53 are passed alternately to head HA and head HB via a head switch 56, respective head drive amplifiers 57, and record/playback switches 58 set to their record positions by the system controller 43. The head switch 56 is operated by appropriate timed signals from the timing generator 54.

The timing generator 54 also provides timing signals ('read window timing signals') for triggering adaptive filtering as is known in the prior art. These timing signals are referenced to the drum position signals from the pulse generator 50 and, on average, will trigger adaptive filtering relatively late in the reading of a track. However, the enable signal from the timing generator 54 serves as a fallback in case the initial header(s) in a track are not detected for some reason.

During playback (data reading) the track signals alternately generated by the heads HA and HB are fed via the record/playback switches 58 (now set by the system controller 43 to their playback positions), respective read amplifiers 59, a second head switch 60, and a clock recovery circuit 61 and the adaptive filter 62, to the input of the formatter/separator unit 53. The operation of the head switch 60 is controlled in the same manner as that of the head switch 56. The unit 53 now serves to generate signals indicating the timing of the Header regions (incorporating the sync bytes) of the data fragments in the track signals, to supply the timing signals to an ATE circuit 49 in the tape deck 11 and to the adaptive filter 62, and to pass the Main-Data-Area fragments to the frame data processor 41. Clock signals are also passed to the processor 41 from the clock recovery circuit 61.

The tape deck 11 has four servos, namely a capstan servo 45 for controlling the rotation of the capstan 15, first and second reel servos 46, 47 for controlling rotation of the reels 13, 14 respectively, and a drum servo 48 for controlling the rotation of the head drum 12 (FIG. 1). Each servo includes a motor M and a rotation detector D both coupled to the element controlled by the servo. Associated with the reel servos 46, 47 is a detector 51 for sensing the ends of the tape: beginning-of-media (BOM) and end-of-media (EOM); this detector 51 may be based for example on motor current sensing, as the motor current of whichever reel is being driven to wind in tape (dependent on the direction of tape travel) will increase significantly upon stalling of the motor at BOM/EOM.

The operation of the tape deck 11 is controlled by a deck controller 52 which is connected to the servos 45 to 48 and to the BOM/EOM detector 51. The controller 52 is operable to cause the servos to advance the tape, (either at normal speed or at high speed) through any required distance. This control is effected either by energizing the servos for a time interval appropriate to the tape speed set, or by feedback of tape displacement information from one or more of the rotation detectors D associated with the servos.

The deck controller 52 is itself governed by control signals issued by the system controller 43. The deck controller 52 is arranged to output to the controller 43 signals indicative of beginning of media (BOM) and end of media (EOM) being reached.

The system controller 43 serves both to manage high-level interaction between the computer and storage apparatus and to coordinate the functioning of the other units of the storage apparatus in carrying out the basic operations of Load-Record-Search-Playback-Unload requested by the computer. In this latter respect, the controller 43 serves to coordinate the operation of the deck 11 with the data processing portion of the apparatus.

In controlling the tape deck 11, the system controller can request the deck controller 52 to move the tape at the normal read/write speed (Normal) or to move the tape forwards or backwards at high speed, that is, Fast Forward (F.FWD) or Fast Rewind (F.RWD).

The ATF circuit 49 is operative during playback to compare the timing of the sync bytes in the selected Header regions in the track signal read from tape, with the drum position signal from the pulse generator 50, to provide an adjustment signal to the capstan servo 45 such that the heads HA, HB are properly aligned with the tracks recorded on the tape. Thus, in this embodiment, reference signals for use in controlling track following by the heads HA and HB are constituted by these selected Header regions.

FIG. 5 illustrates part of two adjacent tracks on a tape medium 10. Referring to FIG. 5, Header regions of fragments near the ends of two adjacent tracks 20 and 21 are indicated at 28a and 28b. The ideal paths for the relevant head along these tracks are shown by the dot-dash lines 80. The ATF circuit measures the time interval Int between the occurrence of the drum position signal, which is generated as one of the heads approaches the tape, and the detection of a reference signal comprising the sync bytes in the Header region 28a or 28b. When the heads are correctly following the paths 80, the time Int will match a preset reference value. If the head reaches the edge of the tape before the tape has advanced enough to line a track up with the head, as shown by the dot-dash line 82 on track 20, the measured time interval Int will be less than this reference value; on the other hand, if the tape has advanced too far, as shown by the dot-dash line 84 on the track 21, the interval Int will be greater than the reference value. By respectively speeding up or slowing down the capstan servo 45, the ATF circuit 49 can correct these tracking errors and keep the heads on the ideal paths 80.

In practice greater reliability can be obtained by measuring the time intervals between the drum position signal and the detection of more than one reference signal (Header region 28). Thus, for example, in the embodiment described below, this time interval is measured for both the first and last Header regions in each track (i.e. in fragments 0 and 63), and the mean value of these two measurements is used to control the tape movement.

Ideally, adaptive filtering starts on commencement of reading main data in a track. FIG. 5 shows the fragments near the ends of two adjacent tracks 20 and 21. In fact, it is typical for the height of the recorded tracks in relation to the reference edge of the tape medium to vary according to environmental factors eg. temperature, humidity and to vary for different tape drives.

The track following circuits including the ATF circuit 49 are shown in more detail in FIG. 6. Referring to FIG. 6 (from which the head and record/playback switches have been omitted for clarity) and as described above, the track signals from the heads HA and HB are fed via the amplifier stage 59 to the clock recovery circuit 61 and via the adaptive filter 62 to the formatter/separator unit 53. The circuit 61, which incorporates a phase-locked loop, provides the unit 53 with a clock signal, which is received together with the track signals by a decoder 90. Decoded signals are in turn supplied to a reference signal detector 91. As described below, this detector identifies fragment Headers in each track, and supplies a pulse at the time of detection of these reference signals, together with the value of the fragment ID, to an ATF controller 92 located in the ATF circuit 49. In addition, the pulses are sent to the timing generator 54.

The timing generator 54 comprises a counter which starts counting on receipt of the drum position signal from the pulse generator 50. Thereafter the timing generator 54 supplies a pulse to the adaptive filter 62 to enable adaptive filtering on the first to occur of:

arrival of a header detection pulse from the reference signal detector 91;

elapse of a predetermined time from arrival of the drum position signal (this is the read window timing signal mentioned above).

In this way, adaptive filtering is initiated on either the detection of the first header by the reference signal detector 91 or the read window timing signal from the timing generator 54.

After elapse of a predetermined time after arrival of the drum position signal, the timing generator 54 supplies another read window timing signal, this time to disable adaptive filtering. In this way, near the end of a track being read, the adaptive filter is deactivated. The counter in the timing generator 54 is then reset ready for the next track.

An interval timer 94 in the ATF circuit 49 receives the drum position signal from the pulse generator 50 associated with the drum 12, and measures time intervals starting with each position signal until it is reset by the ATF controller 92. This controller is coupled to the interval timer to latch its time measurement upon receipt of each reference signal detection pulse, and supplies a control signal to the capstan servo 45 in dependence upon comparison of the latched time measurements with the reference value.

Figure 7:
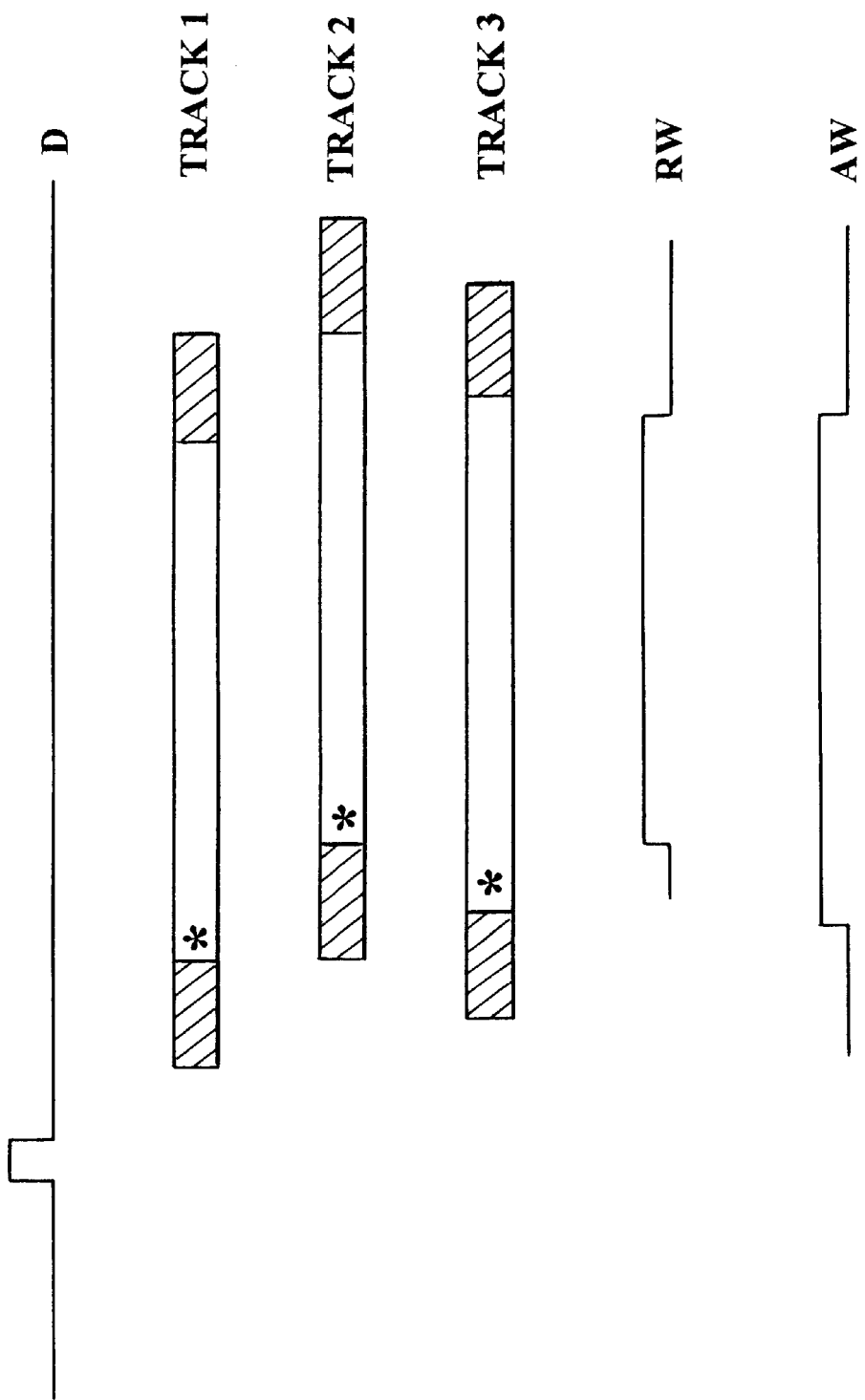
FIG. 7 is a timing diagram illustrating the operation of apparatus embodying the present invention in comparison to known apparatus.

FIG. 7 is a timing diagram. The drum position signal generated by the pulse generator 50 is indicated at D. As mentioned with reference to FIG. 5, the height of tracks with reference to the edge of the tape medium can vary. Track 1 and Track 2 in FIG. 7 indicate the extent of the possible timing difference in the start of a track due to differing track heights. Track 1 is relatively close to the reference edge of the tape medium in comparison to Track 2.

Track 3 indicates a recorded track somewhere inbetween the extremes of Track 1 and Track 2 and shall be taken as a nominal track for the purpose of illustrating the advantages of the present invention. A nominal track is one which is being read by the tape drive which wrote it and under approximately the same environmental conditions under which it was written.

In Tracks 1,2 and 3, the portions at the start and end of the tracks with spectral characteristics which are unsuitable for adaptive filtering are shown shaded. The clear portions of the tracks indicate main data suitable for adaptive filtering. An asterisk in Tracks 1,2 and 3 indicates when the header in the first data fragment in the track occurs.

As described above, in known tape drives, adaptive filtering is initiated by a read window timing signal, indicated at RW, a predetermined time after the drum position signal D. The predetermined time is chosen conservatively so as to account for possible variations in track height. As indicated in FIG. 7, this coincides with the start of main data in Track 2 and results, on average, in adaptive filtering being triggered relatively late in the reading of a track and this is detrimental to error rate performance. However, this is better than starting adaptive filtering too early in the track when the signals from the read head have undesirable spectral characteristics.

Adaptive filtering is also deactivated by the read window timing signal RW near the end of the track being read. The adapt-disable signal coincides with the end of main data in Track 1. The moment at which adaptive filtering is disabled is, in general, less important than the timing of the start of adaptive filtering.

In a tape drive according to the present invention, adaptive filtering is triggered on, detection of the header of the first fragment of data in a sampled track (Track 3 in FIG. 7) which results, on average. in adaptive filtering being triggered earlier in the reading of a track, but not before the signals from the read head have suitable spectral characteristics. The window for adaptive filtering according to the present invention is indicated at AW.

Various modifications may be made to the embodiment as described above. Thus, for example, the invention may be used with a reference signal comprising any format of fragment or block header instead of the one shown in FIG. 3, or indeed comprising any recognizable bit pattern which is known or arranged to occur at a predictable position or positions along a track.

What is claimed is:

1. Apparatus for reading and writing data toga storage medium, wherein the data are written on the medium in tracks, each track having main data and ancillary information and having a predetermined trigger signal pattern, the apparatus comprising:

means for detecting the predetermined trigger signal pattern;

an adaptive filter for signals read from the medium;

and means for triggering adaptive filtering by the adaptive filter of the main data of a track of data on detection of the predetermined trigger signal pattern in that track.

2. Apparatus according to claim 1 wherein each track comprises data fragments each having a header containing the ancillary information wherein at least a header in an initial data fragment in the track comprises the predetermined trigger signal pattern.

3. Apparatus according to claim 2 wherein at least the header in the first data fragment in the track comprises the predetermined trigger signal pattern.

4. Apparatus according to claim 1 wherein the predetermined trigger signal pattern is also used to control the motion of the medium.

5. Apparatus according to claim 1 wherein the means for triggering adaptive filtering of the main data is exclusive of the ancillary information.

6. A method of triggering adaptive filtering in apparatus for reading and writing data to a storage medium in the form of tracks each including main data and ancillary information and having a predetermined trigger pattern, comprising the step of:

monitoring for the presence of a predetermined trigger signal pattern during reading of data from a track and triggering adaptive filtering of the main data in the track when the predetermined trigger signal pattern is detected.

7. The method according to claim 6 wherein the adaptive filtering is exclusive of the ancillary information.

8. Apparatus for reading and writing data to a storage medium, wherein the data are written on the medium in tracks, each track having a predetermined trigger signal pattern, the apparatus comprising:

means for detecting the predetermined trigger signal pattern;

an adaptive filter for signals read from the medium;

means for triggering adaptive filtering for a track of data on detection of the predetermined trigger signal pattern in that track; and means for detecting elapse of a predetermined time from arrival of a drum position signal, the means for triggering adaptive filtering for a track of data being operable on the first occurrence of either:

detection of a predetermined trigger signal pattern; or detection on elapse of a predetermined time from arrival of a drum position signal.

9. Apparatus according to claim 8 wherein each track includes data fragments each having a header containing ancillary information, the predetermined trigger signal pattern being included in at least a header of an initial data fragment in the track.

10. Apparatus according to claim 8 wherein the predetermined trigger signal pattern is included in at least the header in the first data fragment in the track.

11. Apparatus according to claim 8 further including means responsive to the predetermined trigger signal pattern for controlling the motion of the medium.

12. A method of reading data from a storage medium, wherein the data are written on the medium in tracks, each track having a predetermined trigger signal pattern, the method comprising:

detecting the predetermined trigger signal pattern;

adaptive filtering of signals read from the medium;

triggering the adaptive filtering step for a track of data on detection of the predetermined trigger signal pattern in that track; and detecting elapse of a predetermined time from arrival of a drum position signal, the triggering of the adaptive filtering step for a track of data being operable on the first occurrence of either:

detection of a predetermined trigger signal pattern; or detection on elapse of a predetermined time from arrival of a drum position signal.

13. The method according to claim 12 further including controlling the motion of the medium in response to the predetermined trigger signal pattern.

\* \* \* \* \*